US011673475B2

(12) United States Patent
McCall

(10) Patent No.: US 11,673,475 B2
(45) Date of Patent: Jun. 13, 2023

(54) DIRECT CURRENT TRACTION MOTOR CONTROL SYSTEM

(71) Applicant: Transportation IP Holdings, LLC, Norwalk, CT (US)

(72) Inventor: Randy McCall, Barstow, CA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 17/484,010

(22) Filed: Sep. 24, 2021

(65) Prior Publication Data

US 2022/0176828 A1 Jun. 9, 2022

Related U.S. Application Data

(60) Provisional application No. 63/122,316, filed on Dec. 7, 2020.

(51) Int. Cl.
*B61C 15/08* (2006.01)
*B60L 15/20* (2006.01)
(Continued)

(52) U.S. Cl.
CPC ............ *B60L 15/20* (2013.01); *B60K 1/02* (2013.01); *B60K 17/356* (2013.01); *H02P 5/69* (2013.01);
(Continued)

(58) Field of Classification Search
CPC .... H02P 27/04; H02P 5/68; H02P 5/69; H02P 7/04; B60L 15/20; B60L 2200/18;
(Continued)

(56) References Cited

U.S. PATENT DOCUMENTS

| 5,453,672 A | * | 9/1995 | Avitan | B60L 50/52 |
| | | | | 318/493 |
| 6,634,303 B1 | | 10/2003 | Madsen et al. | |

(Continued)

FOREIGN PATENT DOCUMENTS

| CA | 2133471 C | * | 11/1998 | ............ B60L 50/52 |
| CN | 103560576 B | | 5/2016 | |

(Continued)

OTHER PUBLICATIONS

Extended European search report dated May 16, 2022 for corresponding European Patent Application No. 21 210 721.3 (8 pages).

(Continued)

*Primary Examiner* — Karen Masih
(74) *Attorney, Agent, or Firm* — The Small Patent Law Group LLC; Joseph M. Butscher

(57) ABSTRACT

A direct current traction motor control system includes plural motors of with each of the motors configured to be coupled with a different axle of a vehicle and to rotate the axle to propel the vehicle. The motors are coupled with a DC bus and configured to receive DC via the DC bus to power the motors. The system also includes plural switch assemblies with each of the switch assemblies having an H-bridge circuit coupled with a different motor of the motors to control rotation of the motor. The system includes a controller configured to communicate control signals to the switch assemblies to individually control the H-bridge circuits to control one or more of torques output by the motors or rotation directions of the motors.

20 Claims, 2 Drawing Sheets

(51) Int. Cl.
*H02P 7/03* (2016.01)
*B60K 1/02* (2006.01)
*B60K 17/356* (2006.01)
*H02P 5/69* (2006.01)

(52) U.S. Cl.
CPC ............. *H02P 7/04* (2016.02); *B60L 2200/18* (2013.01); *B60L 2200/26* (2013.01); *B60L 2240/423* (2013.01); *B60L 2240/465* (2013.01)

(58) Field of Classification Search
CPC ........... B60L 2240/423; B60L 2200/26; B60L 2240/465; B60K 1/02; B60K 17/356
See application file for complete search history.

(56) References Cited

U.S. PATENT DOCUMENTS 7,126,293 B1   10/2006  Kumar
2008/0180056 A1   7/2008  Maeda et al.
2020/0254900 A1   8/2020  Kumar

FOREIGN PATENT DOCUMENTS

| | | |
|---|---|---|
| EP | 0820140 B1 | 10/2003 |
| EP | 2658096 A2 | 10/2013 |
| EP | 2658096 A3 | 2/2018 |
| JP | H10-094106 A | 4/1998 |
| JP | 2005-130597 A | 5/2005 |
| JP | 2015-023691 A | 2/2015 |
| JP | 2018-157657 A | 10/2018 |

OTHER PUBLICATIONS

Notice of Reasons for Refusal dated May 8, 2023 for corresponding Japanese Patent Application No. 2021-187234. English translation provided (9 pages).

* cited by examiner

DIRECT CURRENT TRACTION MOTOR CONTROL SYSTEM

CROSS-REFERENCE TO RELATED APPLICATIONS

This application claims priority to U.S. Provisional Application No. 63/122,316 (filed 7 Dec. 2020), the entire disclosure of which is incorporated herein by reference.

BACKGROUND

Technical Field

The inventive subject matter described herein relates to control of direct current (DC) traction motors in a vehicle.

Discussion of Art

Some vehicles use DC traction motors that are electrically powered with DC to rotate wheels or axles to propel the vehicles. For example, some rail vehicles (e.g., locomotives) include multiple traction motors that each rotate a different axle of the vehicle. But these traction motors may all be electrically connected with each other such that the traction motors are controlled together. If the torque generated by one traction motor for rotating an axle needs to be reduced (e.g., due to slippage of a wheel coupled with the axle), then the torque generated by all traction motors on all axles is reduced. These vehicles may be incapable of individually controlling the torque generated by each traction motor for rotating a different axle.

While some vehicles may include alternating current (AC) traction motors that can be individually controlled, AC traction motors and the associated power drive systems are more complex and costly than DC traction motors. It may be desirable to have a system and method that differs from those currently available.

BRIEF DESCRIPTION

In one example, a system includes plural motors with each of the motors able to be coupled with a different axle of a vehicle and to rotate the axle to propel the vehicle. The motors are coupled with a DC bus and may receive DC via the DC bus to power the motors. The system also includes plural switch assemblies with each of the switch assemblies having an H-bridge circuit coupled with a different motor of the motors to control rotation of the motor. The system includes a controller that may communicate control signals to the switch assemblies to individually control the H-bridge circuits to control one or more of torques output by the motors or rotation directions of the motors.

In one example, a method includes communicating control signals to switch assemblies of plural DC motors with each of the DC motors coupled with a different axle of a vehicle to rotate the axles and propel the vehicle. The switch assemblies include H-bridge circuits. The method also includes determining whether one or more of a torque or a rotation direction of one or more of the DC motors is to change and, responsive to determining that the one or more of the torque or the rotation direction of the one or more DC motors is to change, changing the control signal that is communicated to one or more of the H-bridge circuits to direct the one or more of the DC motors to change the one or more of the torque or the rotation direction.

In one example, an automobile drive system includes plural DC motors with each of the DC motors able to be coupled with a different axle of an automobile and to rotate the axle to propel the automobile, plural H-bridge circuits with each of the H-bridge circuits able to be coupled with a different motor of the motors to control rotation of the motor, and a controller that may communicate control signals to the H-bridge circuits to individually control one or more of torques output by the motors or rotation directions of the motors.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to control systems for DC traction motors. The control systems are able to individually control the torque and/or direction of rotation of the DC traction motors onboard the same vehicle using switching assemblies and control signals communicated to the switching assemblies. The switching assemblies can include H-bridge circuits having several electrically controlled switches. A controller can send PWM signals to the switching assemblies to control when the different switches in the H-bridge circuits are opened or closed, as well as which switches are open or closed at the same time (or during overlapping time periods). This can control the torque generated by each of the DC traction motors, can cause the DC traction motors to concurrently or simultaneously generate different amounts of torque (e.g., for rotating different axles of the same vehicle at the same time)), and/or can change the direction of rotation of one or more of the DC traction motors (without changing mechanical linkage, such as gears, between the DC traction motor and a corresponding axle).

Figure 1:
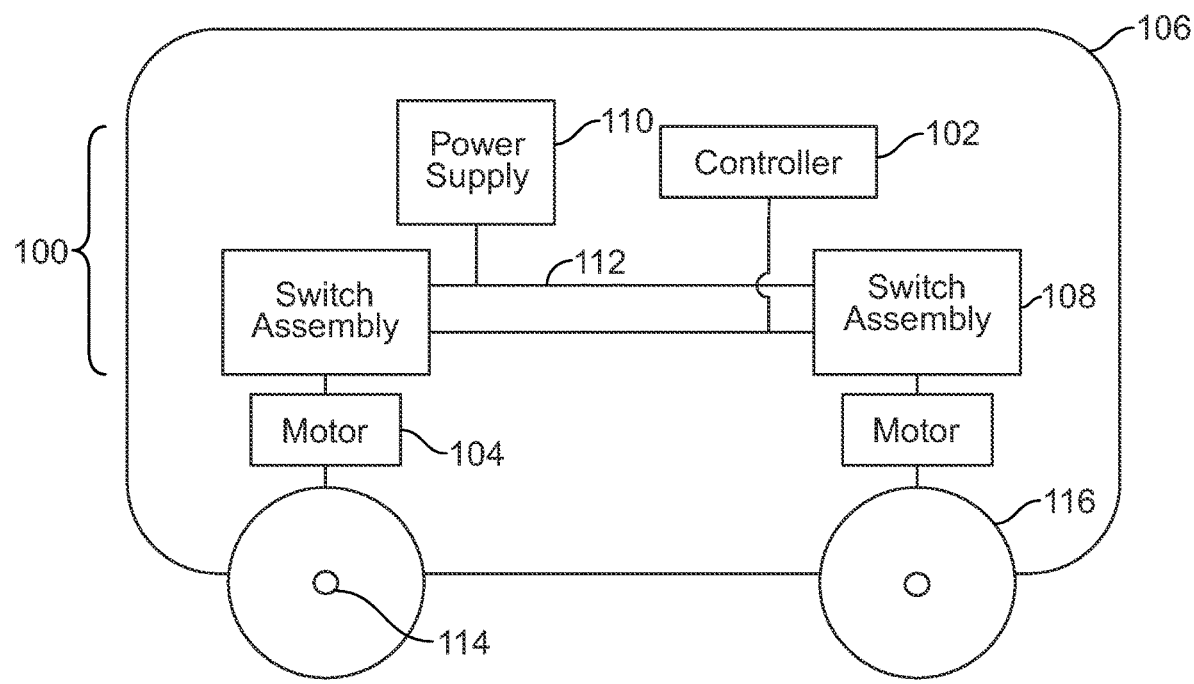
FIG. 1 illustrates one example of a DC traction motor control system.

FIG. 1 illustrates one example of a DC traction motor control system 100. The control system includes a controller 102 that controls operation of multiple DC traction motors 104 of a vehicle 106 via switch assemblies 108. In the illustrated embodiment, each switch assembly is used to control a different DC traction motor. The DC traction motors can be coupled with a power supply 110 via one or more DC buses 112. The power supply can be one or more batteries, connections with an off-board source of current (e.g., a pantograph, conductive shoe, etc. that connects with a catenary, powered rail, etc. for supplying current to the DC traction motors). The DC traction motors can be motors that receive and are powered by DC and not AC. Each of the DC traction motors is coupled with a different axle 114 of the vehicle to rotate wheels 116 coupled with the axle to propel the vehicle. Alternatively, the motors may be coupled with the wheels and not with axles such that the motors rotate the wheels (without also rotating axles that connect wheels of the vehicle).

The controller represents hardware circuitry that includes and/or is connected with one or more processors (e.g., integrated circuits, field programmable gate arrays, microprocessors, or the like) that perform the operations described herein to control the DC traction motors via the switch assemblies. The controller can generate and/or communicate control signals to the switch assemblies to individually control torques output by the DC traction motors and/or rotation directions of the motors. The controller can generate different control signals for different switch assemblies to cause the DC traction motors controlled by the different switching assemblies to generate different torques and/or rotational directions of the motors at the same time.

For example, responsive to a wheel coupled with a first axle of the vehicle slipping on a route (e.g., the wheel rotates faster than other wheels of the same vehicle due to the slippage), the controller can control a first switching assembly that controls conduction of DC to a first DC traction motor (that rotates the first axle) to decrease the torque applied to the first axle by the first DC traction motor, while concurrently or simultaneously controlling a second switching assembly that controls conduction of DC to a second DC traction motor (that rotates a second axle) to increase or maintain the torque applied to the second axle by the second DC traction motor.

Alternatively, the DC traction motors may be coupled with the wheels of the vehicle and/or the vehicle may not include axles between the wheels. For example, each DC traction motor may rotate a different wheel without applying torque to an axle.

The controller also can individually control the DC traction motors responsive to encountering or approaching different conditions, such as a curve in the route, a change in grade in the route, debris on the route, etc. For example, as the vehicle travels over a curve in the route, the controller can increase the torque applied by the DC traction motors that rotate the wheels on one side of the vehicle relative to the torque applied by the DC traction motors that rotate the wheels on the opposite side of the vehicle. This can decrease the likelihood of wheels slipping on the route, can decrease the likelihood of the vehicle tipping over, decreasing the wear and tear on wheels and/or the route on one side of the vehicle, or the like. For example, increasing the torque applied to the wheels on the outside of the vehicle (e.g., the right side of the vehicle while the vehicle is moving on a left turn or curve or the left side of the vehicle while the vehicle is moving on a right turn or curve) relative to the inside of the vehicle (e.g., the left side of the vehicle while the vehicle is moving on the left turn or curve or the right side of the vehicle while the vehicle is moving on the right turn or curve), can decrease the likelihood of the wheels along the inside of the vehicle from slipping, can decrease the wear and tear on the wheels along the outside of the vehicle, can decrease the wear and tear on the portion of the route along the outside of the vehicle, and/or can prevent the vehicle from tipping over.

The controller can individually control the DC traction motors based on a health of the motors. For example, responsive to a state or condition of a first DC traction motor deteriorating, the controller can reduce the torque generated by the first DC traction motor while one or more other DC traction motors in the same vehicle do not decrease torque or increase torque. The state of condition of a DC traction motor can deteriorate when a maximum torque that can be generated by the motor has decreased, the motor overheats, the age of the motor reaches or surpasses a threshold, etc.

The controller can use the control signals to change a direction in which one or more of the DC traction motor rotates. This can allow the controller to change a direction in which the vehicle is propelled by the DC traction motors without changing a mechanical linkage (e.g., gears) between a motor and an axle (or wheel). For example, the control signal can change the direction in which the DC traction motors in a vehicle rotate to cause the vehicle to change the direction in which the vehicle moves.

Figure 2:
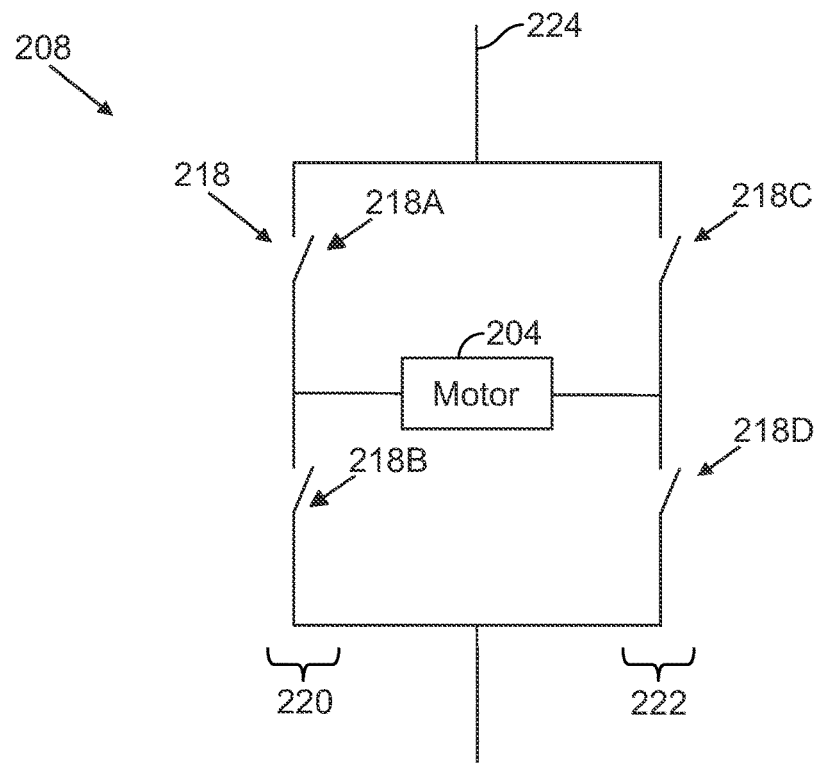
FIG. 2 illustrates one example of a switch assembly.

FIG. 2 illustrates one example of a switch assembly 208. The switch assembly shown in FIG. 2 can represent one (or each of) the switch assemblies 108 shown in FIG. 1. The switch assembly includes several switches 218 (e.g., switches 218A-D) conductively coupled with each other and a DC traction motor 204 in an H-bridge circuit or arrangement. For example, the motor can be disposed between legs 220, 222 of the switch assembly, with each leg including two switches with the motor connected with the leg between the switches.

The controller can communicate the control signals to the switches via a conductive pathway 224 (e.g., the DC bus, another bus, wire, cable, or the like). The control signals direct the switches to open or close at different times. Depending on which switches are open and/or which are closed at the same time, the motor may operate with increased or decreased torque and/or may change the direction in which the motor rotates. For example, control signals that close switches 218A, 218D and open switches 218B, 218C will cause the DC to be conducted to the DC traction motor and cause the motor to rotate in a first direction. But, control signals that close switches 218B, 218C and open switches 218A, 218D will cause the DC to be conducted to the DC traction motor and cause the motor to rotate in a second direction that is opposite the first direction. Closing the switches 218A, 218C in different legs but on the same side of the motor while opening the other switches 218B, 218D (or closing the switches 218B, 218D while opening the switches 218A, 218C) will cause the motor to brake.

The time period over or during which the switches are open or closed and/or the rate at which the switches are opened and closed can increase or decrease the torque generated by the motor. For example, keeping the switches 218A, 218D closed and the switches 218B, 218C open for longer and/or closing the switches 218A, 21D (and opening the switches 218B, 218) more often can increase the torque generated by the motor in a first rotational direction compared to keeping the switches 218A, 218D closed and the switches 218B, 218C open for less time and/or closing the switches 218A, 21D (and opening the switches 218B, 218) less frequently.

The controller can generate the control signals as pulse wave modulation (PWM) signals in one embodiment. Different PWM signals may be generated and communicated from the controller to different switches. Characteristics of the PWM signals may change to change how the switch assembly operates.

Figure 3:
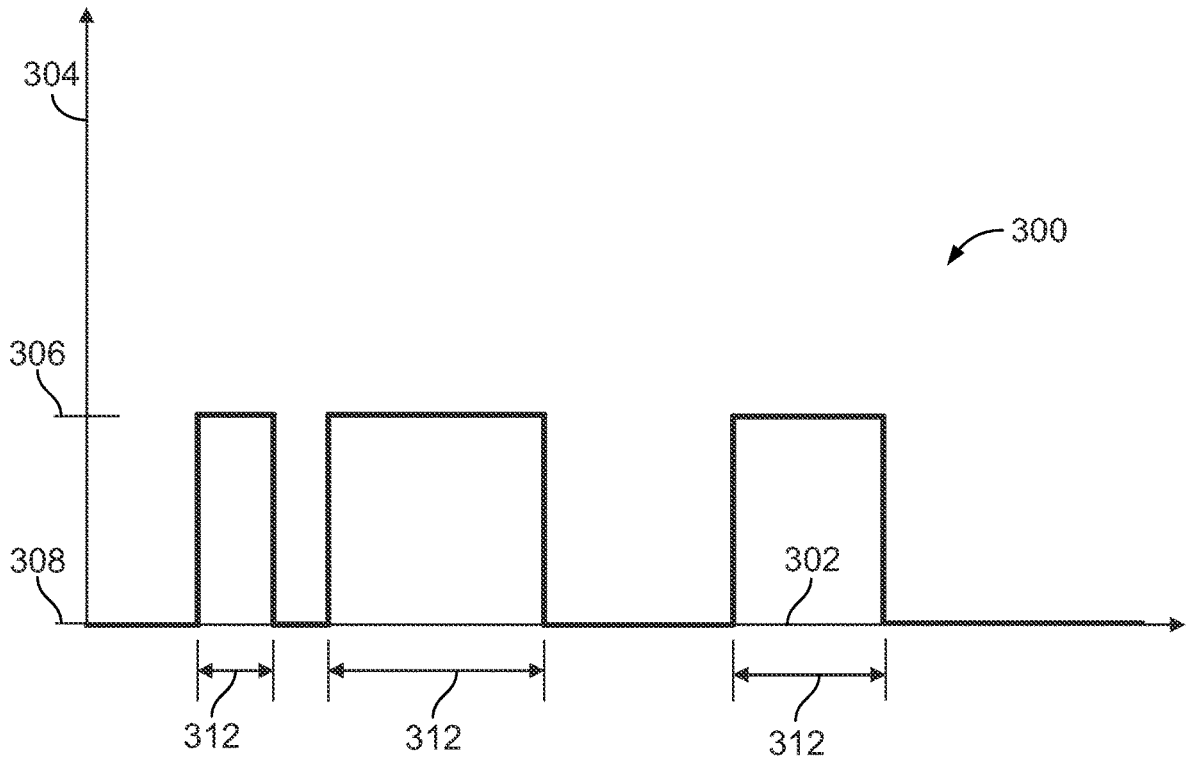
FIG. 3 illustrates one example of a pulse width modulation (PWM) signal.

FIG. 3 illustrates one example of a PWM signal 300. The PWM signal is shown alongside a horizontal axis 302 representative of time and a vertical axis 304 representative of different values (e.g., amplitudes) of the PWM signal. In the illustrated embodiment, the PWM signal alternates between high values 306 and low values 308, but optionally can alternate or vary between or among more values. The high values of the PWM signal represent the pulses of the PWM signal, which are separated from each other by the low values. Activated time periods 310 represent times that the PWM signal remains at the high value, or represent the duration of a pulse. The activated time periods can represent the time periods that the switch (that receives the PWM signal) remains closed (to conduct DC through the switch to the motor). Deactivated time periods 312 represent times that the PWM signal remains at the low value (or is not at the high value), or the time delay between pulses. The deactivated time periods can represent the time periods that the switch (that receives the PWM signal) remains open (to prevent conduction of DC through the switch to the motor). The duty cycle of the PWM signal is the total percentage or fraction of the PWM signal that the activated time periods extend. For example, if three quarters of the total duration of the PWM signal is formed by several pulses, then the duty cycle of the PWM signal is 75%. As another example, if four fifths of the total duration of the PWM signal is formed by several pulses, then the duty cycle of the PWM signal is 80%.

The pulse widths and/or duty cycles of the PWM signals sent to the switches can be controlled and/or based on each other to open or close different switches in the switch assembly at different times. For example, the pulse widths and/or duty cycles of the PWM signals sent to the switches 218A, 218D can be increased (while the switches 218B, 218C remain open or are open more often) to increase the torque generated by the DC traction motor in a first direction relative to PWM signals sent to these switches 218A, 218D having shorter pulse widths and/or duty cycles. As another example, the pulse widths and/or duty cycles of the PWM signals sent to the switches 218B, 218C can be increased (while the switches 218A, 218D remain open or are open more often) to increase the torque generated by the DC traction motor in an opposite, second direction relative to PWM signals sent to these switches 218B, 218C having shorter pulse widths and/or duty cycles.

In operation, the controller can change the pulse widths and/or duty cycles of PWM signals sent to the switches of DC traction motors to individually control the torques generated by the DC traction motors. For example, the PWM signals sent to the switches 218A, 218D can have a first duty cycle to cause the DC traction motors to generate the same or approximately same torque (due to manufacturing tolerances). Responsive to determining that the torque generated by one or more of the DC traction motors is to decrease, the controller can reduce the duty cycle of the PWM signals sent to the switches 218A, 218D of these one or more motors to a smaller, second duty cycle. This will reduce the torque generated by these one or more motors (relative to one or more other motors in the same vehicle that PWM signals with longer or larger duty cycles). For example, responsive to determining that an axle of a vehicle has wheels that slipped on the surface of the route, the controller can decrease the duty cycles of the PWM signals sent to the switches of the switching assembly for the motor(s) that rotate the axle in the direction of travel while keeping the duty cycles of the PWM signals sent to the switches of the other motor(s) of the vehicle. Responsive to determining that the wheels of the axle are no longer slipping on the surface of the route, the controller can increase the duty cycles of the PWM signals sent to the switches of the switching assembly for the motor(s) that rotate the axle in the direction of travel.

As another example in which individual motors rotate different wheels (instead of a motor rotating an axle coupled with multiple wheels), responsive to determining that a wheel of the vehicle has slipped on the surface of the route, the controller can decrease the duty cycles of the PWM signals sent to the switches of that motor while keeping or increasing the duty cycles of the PWM signals sent to the switches of the other motor(s) of the vehicle. Responsive to determining that the wheel is no longer slipping on the surface of the route, the controller can increase the duty cycles of the PWM signals sent to the switches of the switching assembly for that motor that rotates the wheel in the direction of travel.

As another example, the controller can change the PWM signals sent to the switching assemblies to change the direction in which the vehicle moves. The controller can send PWM signals to the switching assemblies of the DC traction motors having duty cycles that close the switches 218A, 218D for 70% of the time and that keep the switches 218B, 218C open for 70% of the time (such that the switches 218B, 218C have a 30% duty cycle). This can cause the motors to rotate axles and/or wheels of the vehicle in a first direction. The controller can change the PWM signals to close the switches 218B, 218C for 70% of the time (or another amount) and that keep the switches 218A, 218D open for 70% of the time (such that the switches 218A, 218D have a 30% duty cycle). This can cause the motors to rotate axles and/or wheels of the vehicle in an opposite, second direction.

The controller also can use the control signals to quickly shut down a DC traction motor. For example, the controller can send a control signal to the switches of a switching assembly associated with a motor that opens the switches (e.g., 218A-D) or that opens the switches in different legs of the switching assembly but on the same side of the motor (e.g., opening the switches 218A, 218C or opening the switches 218B, 218D). The switches can quickly open responsive to receiving these control signals to shut down the motor and isolate the motor from the circuit that includes and connects the power supply, switching assemblies, and motors. The controller can shut down and isolate a motor responsive to one or more events occurring, such as a flashover event, damage to the motor, etc.

Use of the H-bridges to individually control DC traction motors can allow for individual control of each motor, which can provide increased tractive effort with reduced fuel consumption (due to the duty cycles of the motors being less than 100%). Additionally, use of the H-bridges can reduce the down time of motors due to various fault events, such as flashover failures of the motors. A motor that is flashing over can be clamped or shut down faster, which prevents the flashover from ionizing the atmosphere inside the motor and further damage the motor.

Figure 4:
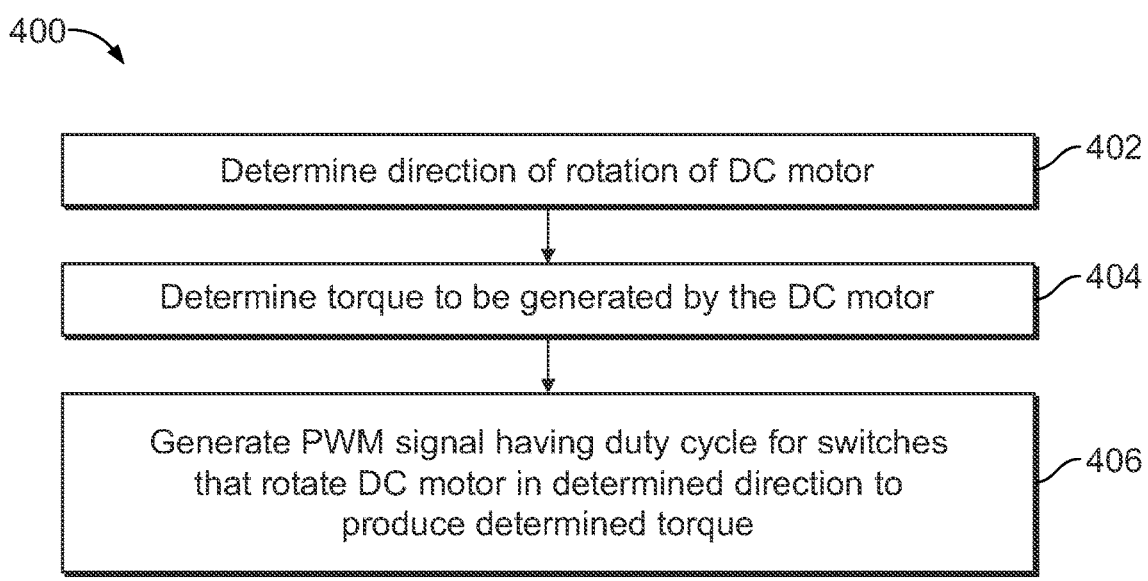
FIG. 4 illustrates a flowchart of one example of a method for individually controlling a DC motor.

FIG. 4 illustrates a flowchart of one example of a method 400 for individually controlling a DC motor. The method can represent operations performed by the controller to individually control the torque and/or rotational direction of several DC traction motors of a vehicle. Alternatively, the method can be used to control DC motors other than traction motors. At step 402, a direction of rotation of a DC motor is determined. For example, the controller can determine what direction a vehicle is to move based on operator input (e.g., via manipulation of a lever, button, switch, etc.), based on a planned movement of the vehicle, or the like. At step 404, a torque to be generated by the DC motor is determined. For example, the controller can determine the torque based on operator input, based on a planned movement of the vehicle, based on a detected wheel slip, based on a detected event (e.g., a flashover event), or the like.

At step 406, PWM signals are generated for the motor based on the direction of rotation and the torque that are determined. The PWM signals have duty cycles for different switches of the switching assembly for the motor that both cause the motor to rotate in the direction determined at step 402 and to generate the torque that is determined at step 404, as described above. The PWM signals are communicated to the switches of the motor to control the motor, as described herein. The method can be repeated for each of the DC motors that are to be individually controlled.

In one example, a system includes plural motors with each of the motors able to be coupled with a different axle of a vehicle and to rotate the axle to propel the vehicle. The motors are coupled with a DC bus and able to receive DC via the DC bus to power the motors. The system also includes plural switch assemblies with each of the switch assemblies having an H-bridge circuit coupled with a different motor of the motors to control rotation of the motor. The system includes a controller that may communicate control signals to the switch assemblies to individually control the H-bridge circuits to control one or more of torques output by the motors or rotation directions of the motors.

The controller may communicate the control signals as PWM signals to individually control the one or more of the torques output by the motors or the rotation directions of the motors. The controller may communicate the control signals to individually control the torques output by the motors. The controller may communicate the control signals to individually control the rotation directions of the motors. The controller may communicate at least one of the control signals to at least one of the switch assemblies to reduce the torque output by at least one of the motors responsive to detection of a wheel slip of the vehicle. In addition to reducing the torque in an absolute sense, the controller may control other aspects of the motor operation. This may be down, for example, to control the rate of change of the torque reduction, the amount of torque reduction, and the like. In one example, the controller uses a machine learning process to determine the torque reduction profile.

The controller may communicate the at least one of the control signals to reduce the torque output by the at least one of the motors while other motors of the motors in the vehicle do not reduce the torque that is output by the other motors. The controller may communicate the control signals to the switch assemblies to change the rotation directions of the motors. The controller may communicate the control signals to the switch assemblies to change the rotation directions of the motors without changing a mechanical linkage of the motors to the axles. A suitable vehicle may be one or more of an automobile, a truck, or a bus. Alternatively, the vehicle may be a rail vehicle.

In one example, a method includes communicating control signals to switch assemblies of plural DC motors with each of the DC motors coupled with a different axle of a vehicle to rotate the axles and propel the vehicle. The switch assemblies include H-bridge circuits. The method also includes determining whether one or more of a torque or a rotation direction of one or more of the DC motors is to change and, responsive to determining that the one or more of the torque or the rotation direction of the one or more DC motors is to change, changing the control signal that is communicated to one or more of the H-bridge circuits to direct the one or more of the DC motors to change the one or more of the torque or the rotation direction.

The control signals may be PWM signals. The one or more of the torque or the rotation direction may be changed responsive to detecting a wheel slip of the vehicle. The control signal that is changed may direct the one or more switch assemblies to reduce the torque output by the one or more of the motors while other motors of the motors in the vehicle do not reduce the torque that is output by the other motors. The control signal may be changed to change the rotation directions of the one or more of the motors without changing a mechanical linkage of the motors to the axles.

In one example, an automobile drive system includes plural DC motors with each of the DC motors configured to be coupled with a different axle of an automobile and to rotate the axle to propel the automobile, plural H-bridge circuits with each of the H-bridge circuits able to be coupled with a different motor of the motors to control rotation of the motor, and a controller that may communicate control signals to the H-bridge circuits to individually control one or more of torques output by the motors or rotation directions of the motors.

The controller may communicate the control signals as PWM signals to individually control the one or more of the torques output by the DC motors or the rotation directions of the DC motors. The controller may communicate at least one of the control signals to at least one of the H-bridge circuits to reduce the torque output by at least one of the DC motors responsive to detection of a wheel slip of the automobile. The controller may communicate the at least one of the control signals to reduce the torque output by the at least one of the DC motors while other DC motors of the DC motors in the automobile do not reduce the torque that is output by the other DC motors. The controller may communicate the control signals to the H-bridge circuits to change the rotation directions of the DC motors without changing a mechanical linkage of the DC motors to the axles.

In one embodiment, the controller has a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, controller includes a policy engine that may apply one or more policies. These policies may be based at least in part on characteristics of a given item of equipment or environment. For example, a lead vehicle may have a policy that includes a policy that only a verifiably local controller can change certain parameters of the vehicle operation. This may, for example, avoid a remote "takeover" by a hacker. By variation and selection based on feedback from the data collection system, the policy engine can, over time, learn to automatically create, deploy, configure, and manage policies across very large numbers of motors.

With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation, a selection of an action can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Suitable success metrics may include, for example, the lowest fuel or energy consumption to complete the trip plan, or the fastest through put to arrive at the destination, or the least expected wear or strain on the equipment, or the lowest likelihood of a collision (or derailment), and the like. Additionally, the success metric may be a combination of the foregoing, which may be weighed relative to each other (or with absolute limits—as fast as possibly with zero collisions, e.g.).

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   plural motors with each of the motors configured to be coupled with a different axle of a vehicle and to rotate the axle to propel the vehicle, the motors coupled with a direct current (DC) bus and configured to receive DC via the DC bus to power the motors;
   plural switch assemblies with each of the switch assemblies having an H-bridge circuit in which one of the motors is disposed between a first leg and a second leg, wherein each of the first leg and the second leg comprises two switches with the one of the motors connected between at least one of the two switches of each of the first leg and the second leg, wherein the H-bridge circuit is configured to control rotation of the one of the motors; and a controller configured to communicate control signals to the switch assemblies to individually control the H-bridge circuits to control one or more of torques output by the motors or rotation directions of the motors.

2. The system of claim 1, wherein the controller is configured to communicate the control signals as pulse width modulation (PWM) signals to individually control the one or more of the torques output by the motors or the rotation directions of the motors.

3. The system of claim 1, wherein the controller is configured to communicate the control signals to individually control the one or more of the torques output by the motors.

4. The system of claim 1, wherein the controller is configured to communicate the control signals to individually control the rotation directions of the motors.

5. The system of claim 1, wherein the controller is configured to communicate at least one of the control signals to at least one of the switch assemblies to reduce torque output by at least one of the motors responsive to detection of a wheel slip of the vehicle.

6. The system of claim 5, wherein the controller is configured to communicate the at least one of the control signals to reduce the torque output by the at least one of the motors while other motors of the motors in the vehicle do not reduce the torque that is output by the other motors.

7. The system of claim 1, wherein the controller is configured to communicate the control signals to the switch assemblies to change the rotation directions of the motors.

8. The system of claim 7, wherein the controller is configured to communicate the control signals to the switch assemblies to change the rotation directions of the motors without changing a mechanical linkage of the motors to the axles.

9. The system of claim 1, wherein the vehicle is one or more of an automobile, a truck, or a bus.

10. The system of claim 1 or any other claim, wherein the vehicle is a rail vehicle.

11. A method comprising:
communicating control signals to switch assemblies of plural direct current (DC) motors with each of the DC motors coupled with a different axle of a vehicle to rotate the axles and propel the vehicle, the switch assemblies including H-bridge circuits in which one of the DC motors is disposed between a first leg and a second leg, wherein each of the first leg and the second leg comprises two switches with the one of the DC motors connected between at least one of the two switches of each of the first leg and the second leg;
determining whether one or more of a torque or a rotation direction of one or more of the DC motors is to change; and
responsive to determining that the one or more of the torque or the rotation direction of the one or more DC motors is to change, changing the control signal that is communicated to one or more of the H-bridge circuits to direct the one or more of the DC motors to change the one or more of the torque or the rotation direction.

12. The method of claim 11, wherein the control signals are pulse width modulation (PWM) signals.

13. The method of claim 11, wherein the one or more of the torque or the rotation direction is determined to be changed responsive to detecting a wheel slip of the vehicle.

14. The method of claim 13, wherein the control signal that is changed directs the one or more switch assemblies to reduce torque output by the one or more of the DC motors while other DC motors of the DC motors in the vehicle do not reduce torque that is output by the other DC motors.

15. The method of claim 11, further comprising switching the rotation directions of the one or more of the DC motors without changing a mechanical linkage of the DC motors to the axles.

16. An automobile drive system comprising:
plural direct current (DC) motors with each of the DC motors configured to be coupled with a different axle of an automobile and to rotate the axle to propel the automobile;
plural H-bridge circuits with each of the H-bridge circuits in which one of the DC motors is disposed between a first leg and second leg, wherein each of the first leg and the second leg comprises two switches with the one of the DC motors connected between at least one of the two switches of each of the first leg and the second leg, wherein each of the H-bridge circuits is configured to control rotation of the one of the DC motors; and
a controller configured to communicate control signals to the H-bridge circuits to individually control one or more of torques output by the DC motors or rotation directions of the DC motors.

17. The system of claim 16, wherein the controller is configured to communicate the control signals as pulse width modulation (PWM) signals to individually control the one or more of the torques output by the DC motors or the rotation directions of the DC motors.

18. The system of claim 16, wherein the controller is configured to communicate at least one of the control signals to at least one of the H-bridge circuits to reduce torque output by at least one of the DC motors responsive to detection of a wheel slip of the automobile.

19. The system of claim 16, wherein the controller is configured to communicate at least one of the control signals to reduce torque output by the at least one of the DC motors while other DC motors of the DC motors in the automobile do not reduce torque that is output by the other DC motors.

20. The system of claim 16, wherein the controller is configured to communicate the control signals to the H-bridge circuits to change the rotation directions of the DC motors without changing a mechanical linkage of the DC motors to the axles.

* * * * *